UNITED STATES PATENT OFFICE.

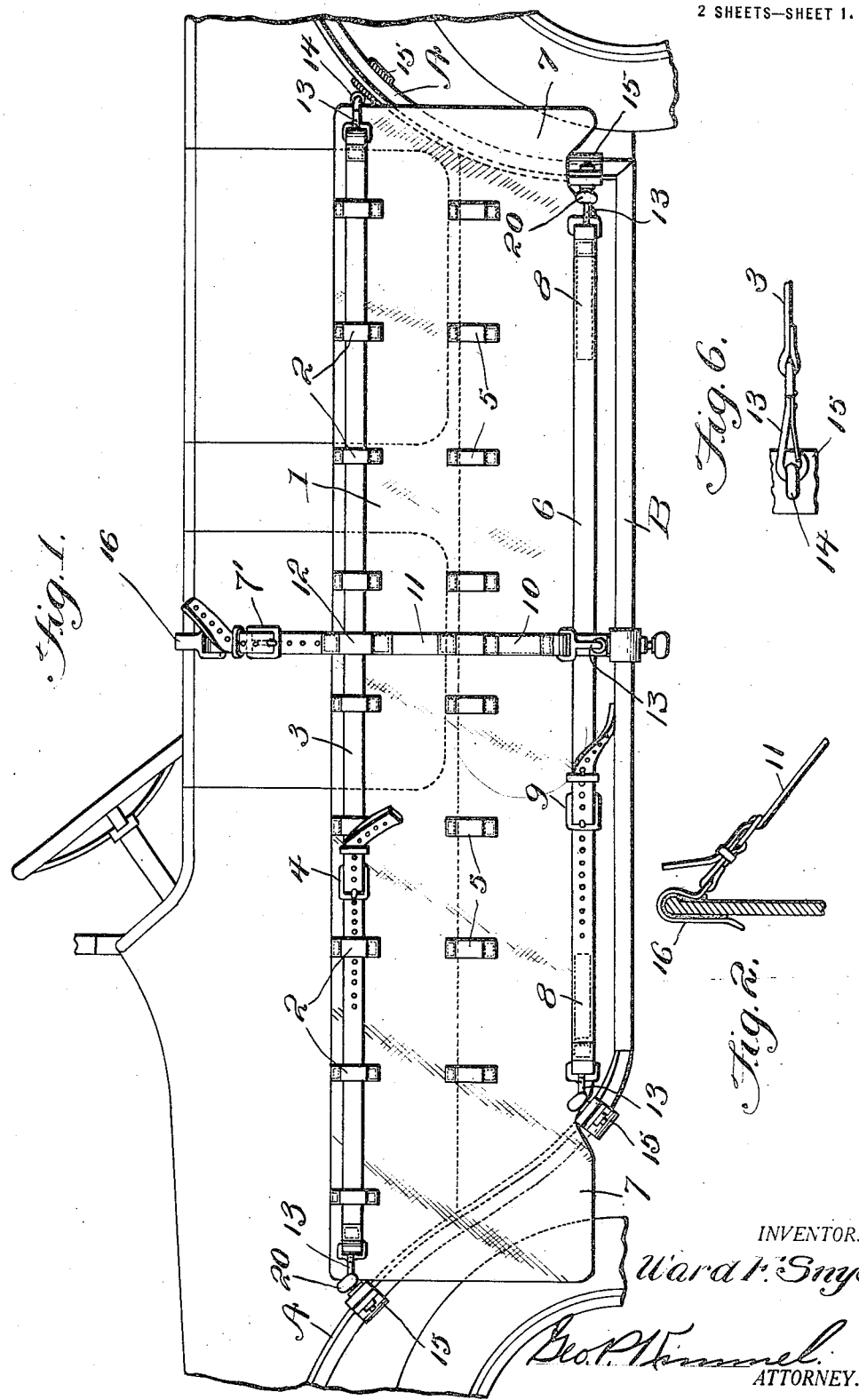

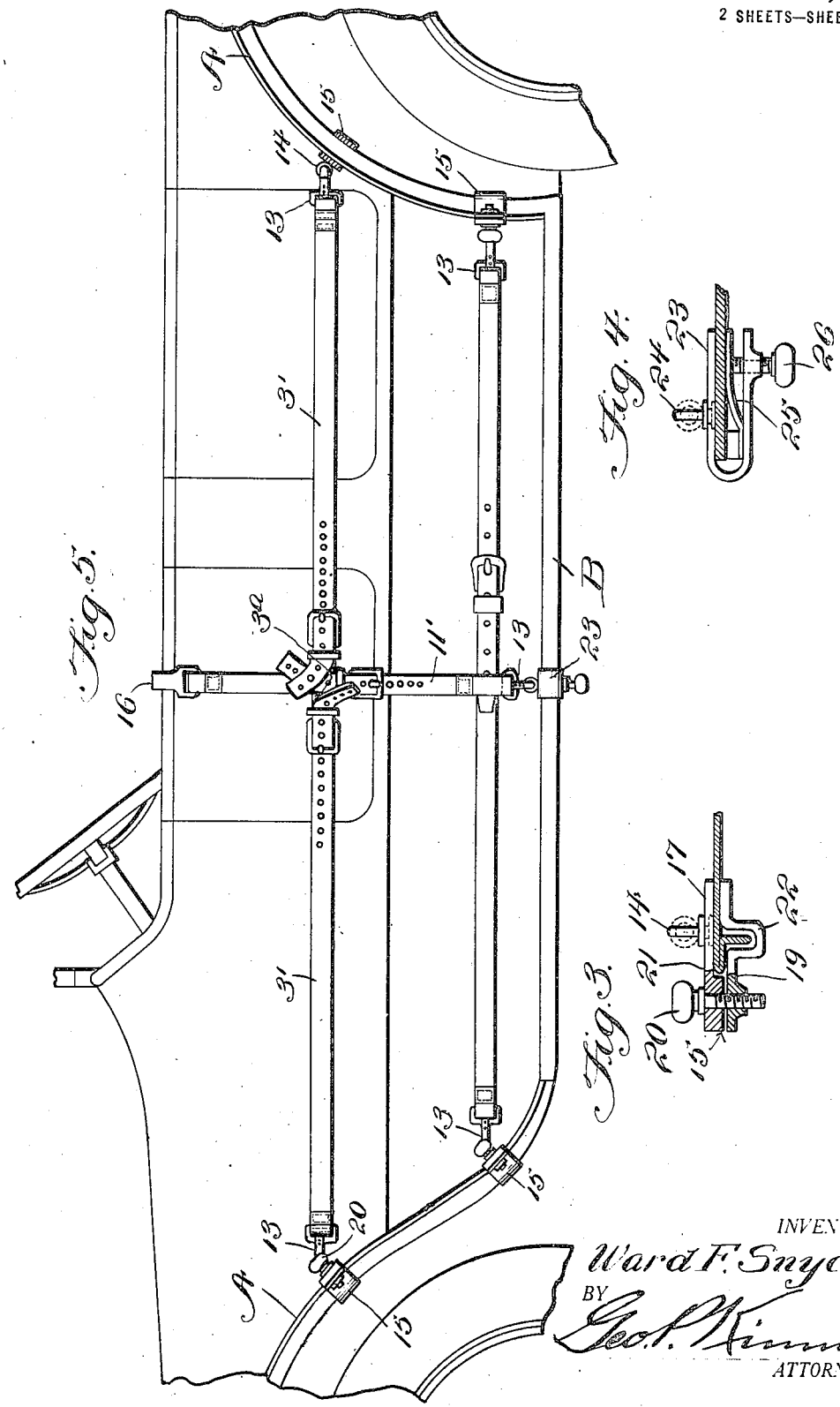

WARD F. SNYDER, OF ST. JOHNS, MICHIGAN.

LUGGAGE-CARRIER.

1,368,852. Specification of Letters Patent. Patented Feb. 15, 1921.

Application filed March 29, 1920, Serial No. 369,508. Renewed December 23, 1920. Serial No. 432,864.

*To all whom it may concern:*

Be it known that I, WARD F. SNYDER, a citizen of the United States, residing at St. Johns, in the county of Clinton and State of Michigan, have invented certain new and useful Improvements in Luggage-Carriers, of which the following is a specification.

This invention relates to improvements in luggage carriers for vehicles, and is particularly designed for use with automobiles whereby to support luggage upon the running board thereof.

The principal objects of the invention are; to provide a luggage carrier which, when not in actual use, may be quickly removed, packed and stored; to provide novel means for attaching the carrier to the fenders of a motor vehicle, and to provide means for adjusting the size of the luggage carrier to conform to the number and size of the articles of luggage to be carried.

A further object of the invention is to provide a luggage carrier which is very simple in construction and may be cheaply manufactured, and which is applicable for use with a wide range of vehicles and may be quickly and easily set up when desired.

For the purpose of illustrating the invention there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangement and organization of these instrumentalities as herein shown and described.

In the accompanying drawings,

Figure 1 is a side view of the luggage carrier applied to a conventional type of motor vehicle.

Fig. 2 is a detail view of a portion of the carrier showing the top fastener for the vertical strap.

Fig. 3 is a detail perspective view of one of the attaching members and with the luggage carrier.

Fig. 4 is a view of a modified form of fastening member.

Fig. 5 is a modified form of luggage carrier.

Fig. 6 is a side elevation of one of the snap hooks thereof.

Like characters of reference indicate like or similar parts throughout the several views of the drawings, in which:

1 designates the body of the luggage carrier which is substantially rectangular in configuration and is preferably formed of a very heavy grade of canvas. Adjacent the top edge of the body 1 are formed spaced loops 2 through which is trained the upper supporting strap 3. The supporting strap 3 is formed in sections connected by a buckle or other suitable fastener 4 in order that the length of the strap may be adjusted to conform to various sizes of loads and types of vehicles. Intermediate the top and bottom edges of the body 1 is a second series of spaced, alined loops 5 through which the strap 3 is trained for securing small size loads.

Extending along the bottom edge of the body 1 is the lower supporting strap 6 which terminates short of the ends of the body so that triangular flaps 7 are formed, which will be hereinafter referred to. As illustrated the ends of the straps 6 are stitched or otherwise permanently secured to the body as at 8 and the intermediate portion is unconnected with the body and has interposed therein a buckle 7' or other fastening member 9 which connects the ends of the strap, the same being sectional to permit of adjustment, as has been pointed out with respect to the strap 3.

Extending transversely of the body 1 and stitched or otherwise secured thereto as at 10 is a vertical securing strap 11 which is formed with a loop 12 through which the upper supporting strap 3 passes.

The terminals of each of the straps 3, 6 and 11 (except the upper end of the strap 11) have secured thereto snap fasteners 13, and the snap fasteners 13 of the upper and lower straps engage in eyes 14 formed in fastening members 15 removably fixed to the forward and rear fenders A of an automobile. The snap fastener on the lower end of the vertical strap 11 also engages in a like fastening member 15 engaging the running board B of the automobile, while a hook 16 carried on the opposite end of the strap 11 is adapted to be placed over the top edge of an automobile side to securely hold the carrier in place.

Referring particularly to Fig. 3 the fastening members are formed with a top plate 17 upon which is mounted an eye 14, and a lower plate 19 adjustably secured to the top plate by a thumb screw 20 to form a clamp. The top plate is cut away as at 21 to receive the mud guard or running board and the lower plate 19 is formed with a bend 22 for receiving the depending flange of the mud guard as shown.

A modified form of the fastener (see Fig. 4) contemplates the provision of a U-shaped body 23 upon the upper arm of which is mounted an eye 24, and a plate spring 25 is mounted on the upper face of the lower arm, and is adapted to be forced against the guard by a thumb nut 26 as shown.

In the modified form of the invention (see Fig. 5) the body 1 is eliminated and the straps are used to simply bind the luggage in place. In this form the upper supporting strap 3′ is formed in three sections, the central section 3ᵃ of which is secured to the vertical strap 11′ and is adjustably connected with the remaining sections by buckles. The vertical strap 11′ is also formed in sections adjustably connected together by a buckle as illustrated.

In operation the fastening members 15 are attached to the forward and rear mud guards on one side of a vehicle and the longitudinal straps 3 and 6 adjusted in length to securely hold the luggage in place, whereupon the vertical strap 11 is disposed with the hook 16 engaging over the side of the car and tightened to prevent displacement of the luggage. The triangular flaps 7 of the body 1 are tucked about the ends of the luggage and prevents undue collection of dust and dirt thereabout. In dismounting the carrier the fastening members are merely removed and the carrier rolled up and placed under the seat of the vehicle.

From the foregoing description taken in connection with the accompanying drawing, it is thought that a clear and comprehensive understanding of the construction, operation, and advantages of the invention may be had, but while I have shown and described the device as embodying a specific structure, I desire it to be understood that such variations may be made in said structure, as do not depart from the spirit and scope of the invention as claimed.

What I claim is:

1. A luggage carrier for vehicles comprising an elongated body, loops formed in the body, an upper longitudinally disposed supporting strap engaged in the loops, a vertical strap attached to the body, a lower longitudinally disposed supporting strap attached to the body, and fasteners carried by the strap for detachably connecting the carrier to a base.

2. A luggage carrier for vehicles comprising an elongated fabric body, rows of loops formed in the body, a supporting strap trained through the loops and extending longitudinally of the body, a supporting strap directly attached to the body and extending longitudinally thereof, a strap attached to the body and extending transversely thereof, and fasteners carried by the straps for detachably connecting the carrier to a base.

In testimony whereof, I affix my signature hereto.

WARD F. SNYDER.